United States Patent Office 3,743,624
Patented July 3, 1973

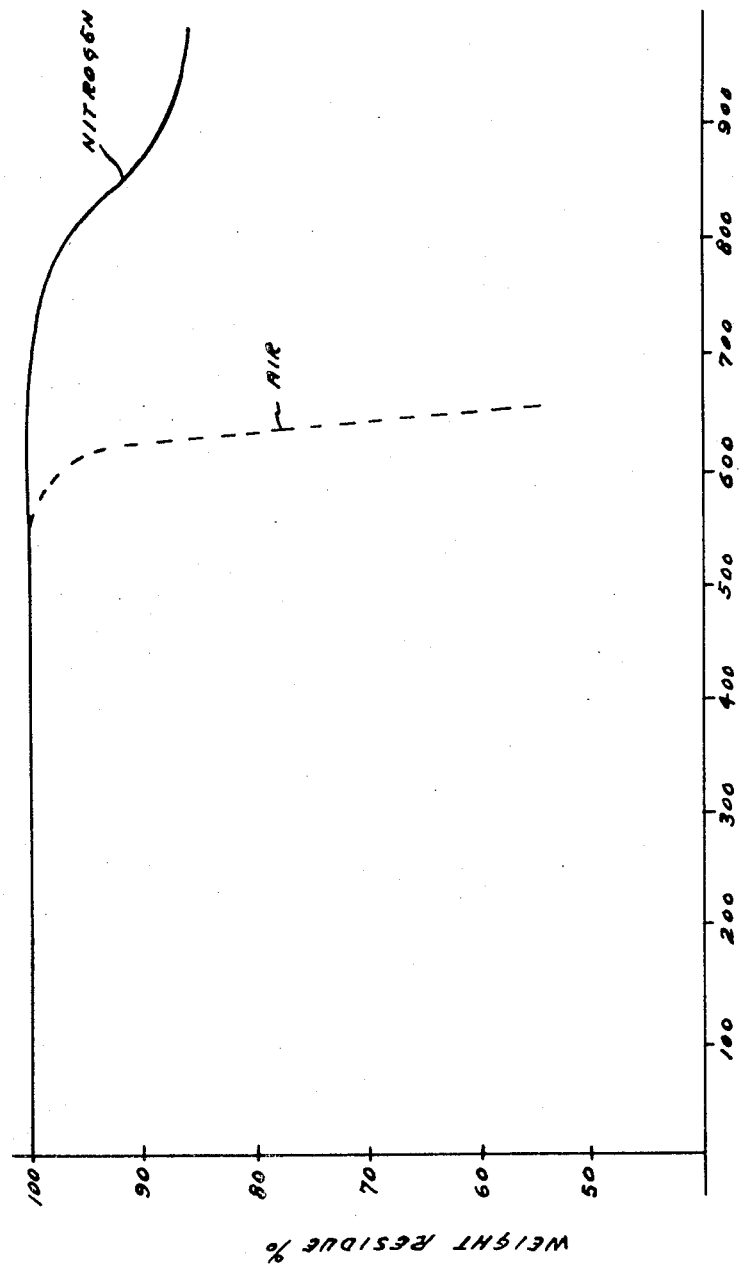

3,743,624
BENZOFUROISOQUINOLINE POLYMERS AND METHOD FOR SYNTHESIZING SAME
Fred E. Arnold, Centerville, Albert J. Sicree, Dayton, and Richard L. Van Deusen, Xenia, Ohio, assignors to the United States of America as represented by the Secretary of the Air Force
Filed Oct. 6, 1972, Ser. No. 295,787
Int. Cl. C08g 20/32
U.S. Cl. 260—47 CP                    10 Claims

ABSTRACT OF THE DISCLOSURE

Benzofuroisoquinoline ladder polymers are prepared by the condensation of 2,3,7,8-tetraaminodibenzofuran with an aromatic tetracarboxylic acid or a dianhydride thereof. The polymers possess a high degree of thermal stability, a property which renders them particularly suitable for use in high temperature applications such as in the fabrication of plastic composites, fibrous materials and protective coatings.

FIELD OF THE INVENTION

This invention relates to new thermally stable polymeric compositions. In one aspect it relates to a method for synthesizing the polymers.

BACKGROUND OF THE INVENTION

In recent years a large amount of research has been directed toward the production of materials which are physically and chemically stable at elevated temperatures. The demand for such materials has to a great degree been accelerated because of their usefulness in aerospace applications such as in the fabrication of nose cones and heat shields for space vehicles, rocket engine components and the like. Much of the research work has involved the synthesis of so-called ladder or double strand polymers. Because of the structure of these polymers, they are able to sustain several bond scissions along their backbones without breakdown of the polymers. As a result they are able to withstand temperatures which would cause the deterioration of single strand polymers.

The literature describes several ladder polymers that have been prepared by the polycondensation of an aromatic tetracarboxylic acid and a tetraamine. For example, F. E. Arnold and R. L. Van Deusen in the Journal of Polymer Science, vol. 6, p. 815 (1968) disclose the synthesis of ladder polymers by the reaction of 1,4,5,8-naphthalene tetracarboxylic acid with 1,4,5,8-tetraaminonaphthalene. In Macromolecules, vl. 2, p. 497, these same authors disclose the preparation of ladder polymers by the condensation of 1,4,5,8-naphthalene tetracarboxylic acid with 1,2,4,5-tetraaminobenzene. Other ladder polymers are disclosed by Dawans and Marvel in the Journal of Polymer Science, A3, 3549 (1965), by Bell and Pezdirtz in the Journal of Polymer Science, B3, 977 (1965), and by Paufler in U.S. Pat. No. 3,414,543. The prior art polymers have not proven to be entirely satisfactory for several reasons, depending generally upon the reactants utilized. These deficiencies include the production of polymers of too low molecular weight and unsatisfactory stability at elevated temperatures as well as difficulty in synthesis of the polymers.

It is an object of this invention, therefore, to provide improved thermally stable ladder polymers.

Another object of the invention is to provide a method whereby ladder polymers are readily synthesized.

A further object of the invention is to provide ladder polymers from which films and fibers can be fabricated.

Other objects and advantages of the invention will become apparent to those skilled in the art upon consideration of the accompanying disclosure and the drawing which is a graph showing the results of thermal gravimetric analysis of a polymer of this invention.

SUMMARY OF THE INVENTION

This invention resides in a thermally stable polymer composition which consists essentially of recurring units having the following formula:

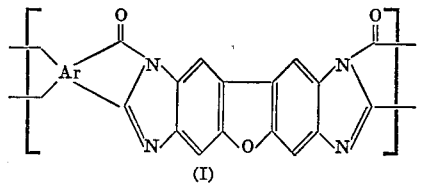

(I)

wherein Ar is a tetravalent aromatic radical. The following are examples of tetravalent aromatic radicals:

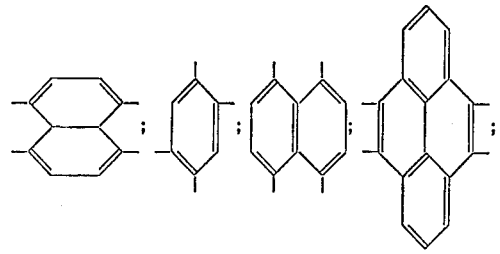

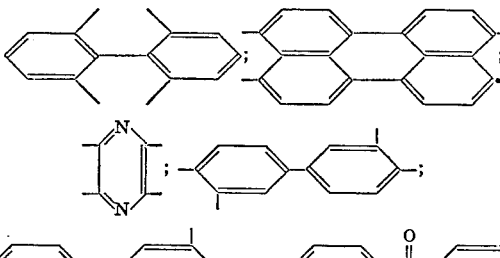

Of the polymers containing the aforementioned repeating units, those in which Ar is 1,4,5,8-naphthalene are preferred. There are generally at least two and preferably at least four of the repeating units. In general, the number of repeating units is such that the polymer has an intrinsic viscosity of about 0.75 to 3.0 dl./g. in methanesulfonic acid.

In one embodiment, the present invention resides in a method for preparing the benzofuroisoquinoline polymers. Thus, the polymers are synthesized by the condensation of 2,3,7,8-tetraaminodibenzofuran with an aromatic tetracarboxylic acid or a corresponding dianhydride. The condensation reaction involved is illustrated by the following equation:

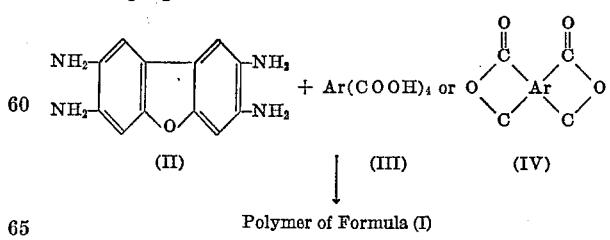

Polymer of Formula (I)

In the above equation, Ar is as indicated hereinabove.

The condensation reaction depicted by the above equation is conducted in polyphosphoric acid or in a fused inorganic salt, such as antimony trichloride or bismuth trichloride. When an aromatic carboxylic acid is used, it is generally preferred to conduct the polymerization reaction in polyphosphoric acid. The fused salts are usually preferred when the dianhydride is employed as one of the reactants. When utilizing polyphosphoric acid as the reaction medium, the condensation reaction is generally conducted in an inert atmosphere at a temperature ranging from about 100 to 250° C., for a period of about 5 to 20 hours. The reaction is usually carried out in an inert atmosphere at a temperature in the range of about 60 to 180° C. for a period of about 5 to 20 hours when employing a fused salt as the reaction medium. While high molecular weight polymers are obtained when using either type of solvent, it is often preferred to conduct the reaction in a fused salt, utilizing a dianhydride as one of the reactants. This is because the fused salts are not polymeric as is polyphosphoric acid, thereby obviating any difficulty in stirring the reaction medium and concomitantly permitting higher concentrations of reactants. Furthermore, the dianhydrides have a longer shelf-life and can be obtained in a higher degree of purity than the tetraacids.

Any suitable inert gas can be used in the practice of the method. Examples of such gases include nitrogen, argon, helium, and the like.

Examples of aromatic tetracarboxylic acids (Formula III) that can be used include 1,2,4,5-benzenetetracarboxylic acid; 1,2,6,7-pyrenetetracarboxylic acid; o,o,o′,o′-diphenyltetracarboxylic acid; 1,2,5,6-naphthalenetetracarboxylic acid; 3,4,9,10-perylenetetraacid; pyrazenetetraacid; 3,4,3′,4′-diphenyltetraacid; 3,4,3′,4′ - diphenyloxidetetraacid; 3,4,3′,4′-diphenylketonetetraacid; and the like. The corresponding dianhydrides of the aforementioned carboxylic acids are examples of compounds of Formula IV that can be used. It is often preferred to employ 1,4,5,8-naphthalenetetracarboxylic acid or the dianhydride thereof. The aromatic tetracarboxylic acids and their corresponding dianhydrides are well known compounds that are described in the literature.

In preparing the polymers of this invention as described above, the reactants are generally employed in equimolar amounts. While a small excess of one of the reactants is not detrimental to the condensation reaction, a considerable excess results in the production of lower molecular weight products.

In recovering the polymer product, the reaction mixture is cooled, e.g., to room temperature, at the end of the reaction period. The reaction mixture is then poured into a non-solvent for the polymer, such as an alcohol or a weak acid, thereby causing the polymer to precipitate from solution. After recovery of the polymer, as by filtration or decantation, it is then washed, e.g., with an alcohol, a weak acid or a mixture thereof and then dried under a vacuum at a temperature ranging from about 70 to 100° C. The dried polymer is then purified by dissolving the polymer in a solvent therefor, such as methane sulfonic acid. Thereafter, the solution is added to a non-solvent, such as an alcohol, so as to precipitate the polymer from solution. After separation of the precipitated polymer, it is generally dried under a vacuum, thereby yielding a purified polymer product. It is to be understood that modifications in the recovery procedure can be followed without departing from the spirit and scope of the invention. For example, the precipitation of the polymer from solution can be repeated one or more times in order to further purify the polymer.

The 2,3,7,8-tetraaminodibenzofuran, used as the monomer in synthesizing the polymers of this invention, are prepared by a two step nitration of dibenzofuran, followed by a catalytic reduction in a hydrochloric acid-methanol medium. As a result of the reduction, there is obtained a tetra-hydrochloride of a high degree of purity. The free tetraamine is liberated from its hydrochloride by treatment with triethylamine in methanol. The monomer is light tan in color, has a melting point of 317–319° C., and exhibits excellent shelf life when stored in the dark under a nitrogen atmosphere.

A more complete understanding of the invention can be obtained by referring to the following illustrative examples which are not intended, however, to be unduly limitative of the invention.

EXAMPLE I

Preparation of 2,3,7,8-tetraaminodibenzofuran (a) 3,8-dinitrodibenzofuran.—To a solution of 50.0 g. (0.298 mole) of dibenzofuran in 500 ml. of acetic acid at 90° C. was added 250 ml. of fuming nitric acid (90+ percent) in 2 hours. After 45 minutes, a thick precipitate formed which redissolved near the end of the addition when a thick precipitate formed again. After the reaction mixture was stirred and heated at 90 to 95° C. for an additional 3 hours, it was cooled to 17° C. and filtered. The precipitate, washed free of acid with water and air dried, weighed 60.0 g. (78%, crude yield) and had a melting range of 216–226° C. Recrystallization from 2,220 ml. of butanone gave 30.6 g. (40%) of 3,8-dinitrodibenzofuran, M.P. 247–252° C.

Two additional runs were carried out, using 200.0 g. (1.19 mole) of acetic acid and 1000 ml. of fuming nitric acid. In one run 130.4 g. (42.6% yield) of 3,8-dinitrobenzofuran (M.P. 243–247° C.) was obtained while 136.0 g. (44.3% yield) of the product (M.P. 245–250° C.) was produced in the other run.

(b) 2,3,7,8-tetranitrodibenzofuran.—A mixture of 310 ml. of concentrated sulfuric acid and 310 ml. of fuming nitric acid (90+ percent) was cooled in an ice bath to 3° C. and 60.0 g. (0.232 mole) of 3,8-dinitrodibenzofuran was added during a 2 hour period with good agitation. The mixture was stirred at 3–5° C. for 3 hours, then poured into 2 liters of ice water. The precipitate, isolated by filtration and washed acid free with water and air dried, weighed 79.1 g. (98%) and had a melting range of 180–230° C. The solid, extracted in 600 ml. of refluxing toluene, then in 500 ml. of refluxing toluene left 28.9 g. of solid which melted at 268–285° C. One recrystallization from 650 ml. of acetic acid gave 22.8 g. (28.3%) of 2,3,7,8-tetranitrodibenzofuran, M.P. 284–288° C.

(c) 2,3,7,8 - tetraaminodibenzofuran (hydrochloride salt).—A 1.0 g. sample of 2,3,7,8-tetranitrodibenzofuran was slurried in 150 ml. of methanol. To the slurry was added approximately 0.2 g. of Adam's catalyst ($PtO_2$) and 10 ml. of methanol containing approximately 0.42 mg. of anhydrous hydrogen chloride per milliliter. The mixture was then shaken on a Parr hydrogenation apparatus for 1 hour under 50 p.s.i.g. of hydrogen. The required pressure drop was observed within 15 minutes. The catalyst was removed by filtration, and the solvent evaporated in vacuo to obtain a yellow-green solid. The solid was slurried with acetone, filtered, and air dried to afford 1.0 g. of green product, M.P. >350° C. The infrared spectrum of the sample was indicative of an amine hydrochloride. A total of 36 reactions were carried out on a 2.0 g. scale to give 77.0 g. of amine salt.

(d) 2,3,7,8-tetraaminodibenzofuran (free amine).—To a solution of 27 g. of the amine salt prepared as described in paragraph (c) in 2,700 ml. of methanol was added 27 ml. of concentrated hydrochloric acid and 36 ml. of water. Under a nitrogen atmosphere, 57.5 g. of triethylamine in 360 ml. of methanol was added dropwise over a period of 30 minutes. Near the end of the addition, a solid precipitated and the solution turned a deep purple. After completion of the addition, 15 g. of additional triethylamine was added to increase the alkalinity of the mixture.

The mixture was stirred for 4 hours at room temperature, and then filtered under nitrogen. The solid was combined with the product isolated from a second identical reaction, and dried at room temperature at 0.1 mm. Hg without a drying agent for 24 hours.

A total of 10.8 g. (20% conversion) of 2,3,7,8-tetraaminodibenzofuran was recovered, M.P. 317–319° C.

Analysis.—Calcd. for $C_{12}H_{12}N_4$ (percent): C, 63.14; H, 5.30; N, 24.54. Found (percent): C, 63.12; H, 5.34; N, 24.60.

EXAMPLE II

A mixture of 1.52 g. (0.005 mole) of 1,4,5,8-naphthalenetetracarboxylic acid and 1.14 g. (0.005 mole) of 2,3,7,8-tetraaminodibenzofuran was added under a nitrogen atmosphere to 75 ml. of deoxygenated polyphosphoric acid at 90° C. The mixture was gradually heated to 175° C. over a period of 6 hours, and the homogenous red solution was stirred at that temperature for sixteen hours while it turned to a deep purple color. The reaction was completed by heating at 200° C. for 5 additional hours. The polymer was isolated as a fine purple precipitate upon pouring the cooled reaction mixture into 2 liters of methanol. The filtered product was thoroughly washed with boiling methanol and dried at 80° C. and 0.01 mm. Hg pressure for 24 hours to give 2.1 g. of product (100%). The polymer was purified by dissolving it in methanesulfonic acid and reprecipitating into an excess of methanol. The reprecipitated material had in intrinsic viscosity ($\eta$) of 1 as determined in methane sulfonic acid.

Analysis.—Calcd. for $C_{26}H_8N_4O_3$ (percent): C, 73.59; H, 1.90; N, 13.20. Found (percent): C, 73.40; H, 2.10; N, 12.92.

EXAMPLE III

To 100 g. of antimony trichloride was added, under a a nitrogen atmosphere, 2.682 g. (0.01 mole) of 1,4,5,8-naphthalenetetracarboxylic acid dianhydride and 2.28 g. (0.01 mole) of 2,3,7,8-tetraaminodibenzofuran. The mixture was slowly heated to 150° C. and maintained at that temperature for 13 hours. The reaction mixture was cooled to room temperature and glacial acetic acid was added to precipitate a purple solid. The polymer was collected, washed with refluxing acetic acid, methylene chloride and methanol, dried under reduced pressure, and reprecipitated from methane sulfonic acid. The polymer 4.2 g. (99%), had an intrinsic viscosity of 2.0 as determined in methane sulfonic acid.

Analysis.—Calcd. for $C_{26}H_8N_4O_3$ (percent): C, 73.59; H, 1.90; N, 13.20. Found (percent): C, 72.89; H, 2.30; N, 13.56.

EXAMPLE IV

A sample of the polymer prepared as described in Example II was used to prepare fibers. In preparing the fibers, a 4 percent solution of the polymer in methane sulfonic acid was extruded by a syringe into anhydrous methanol. The fibers that formed were dark brown in color

EXAMPLE V

A sample of the polymer prepared as described in Example II was used to fabricate films. The films were cast from methane sulfonic acid solutions by removal of the acid under reduced pressure (0.03 mm. Hg) at 60° C. The films were dark in color, exhibiting a golden luster.

EXAMPLE VI

A sample of the polymer prepared as described in the preceding examples was subjected to thermogravimetric analysis. The data obtained are shown graphically in the drawing. Thus, the weight loss curves show breaks in the region of 550° C. and 650° C. in air and nitrogen, respectively.

The data in the foregoing examples demonstrate that the ladder polymers of this invention are stable at very high temperatures. Furthermore, the examples show that the polymers can be readily synthesized and that they can be used in preparing both fibers and films.

As will be evident to those skilled in the art, modifications of the present invention can be made in view of the foregoing disclosure. Such modifications fall within the spirit and scope of the invention.

We claim:

1. A thermally stable film and fiber forming polymer consisting essentially of repeating units having the following formula:

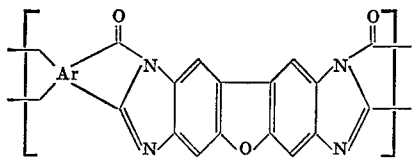

wherein Ar is a tetravalent aromatic radical.

2. The polymer of claim 1 in which Ar is

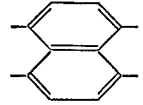

3. The polymer of claim 1 in which Ar is

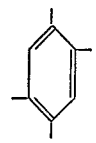

4. The polymer of claim 1 in which Ar is

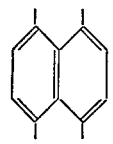

5. The polymer of claim 1 in which Ar is

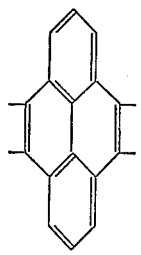

6. The polymer of claim 1 in which Ar is

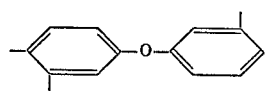

7. A method of preparing a thermally stable polymer which comprises reacting substantially equimolar amounts of 2,3,7,8-tetraaminodibenzofuran and a compound selected from the group of compounds having the following formulae:

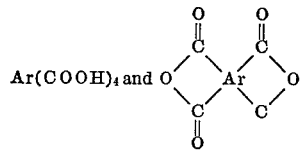

wherein Ar is a tetravalent aromatic radical, the reaction being conducted under an inert atmosphere and in a medium selected from the group consisting of polyphosphoric acid, fused antimony trichloride and fused bismuth trichloride.

8. The method according to claim 7 in which said compound is 1,4,5,8 - naphthalenetetracarboxylic acid; said medium is polyphosphoric acid; and the reaction is carried out at a temperature in the range of about 100 to 250° C. for a period of about 5 to 20 hours.

9. The method according to claim 7 in which said compound is 1,4,5,8-naphthalenetetracarboxylic acid dianhydride; said medium is fused antimony trichloride; and the reaction is carried out at a temperature in the range of about 60 to 180° C. for a period of about 5 to 20 hours.

10. The method according to claim 7 in which said compound is 1,4,5,8-naphthalenetetracarboxylic acid dianhydride; said medium is fused bismuth trichloride; and the reaction is carried out at a temperature in the range of about 60 to 180° C. for a period of about 5 to 20 hours.

References Cited
UNITED STATES PATENTS

| | | | |
|---|---|---|---|
| 3,414,543 | 12/1968 | Paufler | 260—47 |
| 3,518,232 | 6/1970 | Bell | 260—78 |
| 3,624,249 | 11/1971 | Marvel | 260—47 |
| 3,681,284 | 8/1972 | Grundschober et al. | 260—47 |

WILLIAM H. SHORT, Primary Examiner

L. L. LEE, Assistant Examiner

U.S. Cl. X.R.

260—30.8 R, 65, 78 TF